(12) United States Patent
Yang et al.

(10) Patent No.: US 11,619,939 B2
(45) Date of Patent: Apr. 4, 2023

(54) SELF-DRIVING VEHICLE POSITIONING METHOD, APPARATUS AND STORAGE MEDIUM

(71) Applicant: APOLLO INTELLIGENT DRIVING TECHNOLOGY (BEIJING) CO., LTD., Beijing (CN)

(72) Inventors: Fan Yang, Beijing (CN); Xiaoxing Zhu, Beijing (CN); Shiyu Song, Sunnyvale, CA (US); Zhijie Wang, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 172 days.

(21) Appl. No.: 16/708,527

(22) Filed: Dec. 10, 2019

(65) Prior Publication Data

US 2020/0183393 A1     Jun. 11, 2020

(30) Foreign Application Priority Data

Dec. 10, 2018   (CN) .......................... 201811505085.3

(51) Int. Cl.
*G05D 1/00*     (2006.01)
*G05D 1/02*     (2020.01)
(Continued)

(52) U.S. Cl.
CPC ......... *G05D 1/0088* (2013.01); *G05D 1/0246* (2013.01); *G06V 20/58* (2022.01); *G06V 20/588* (2022.01); *G05D 2201/0213* (2013.01)

(58) Field of Classification Search
CPC ......... G05D 1/0088; G05D 2201/0213; G05D 1/0212; G05D 1/0274; G05D 1/0287;
(Continued)

(56) References Cited

U.S. PATENT DOCUMENTS

2010/0047744 A1* 2/2010 Miura .................. G06Q 10/047
                                                        434/66
2010/0063725 A1* 3/2010 Miura .................... G01C 21/26
                                                        701/408
(Continued)

FOREIGN PATENT DOCUMENTS

CN          104787044 A      7/2015
CN          107850448 A      3/2018
(Continued)

OTHER PUBLICATIONS

Suh, In-Soo et al., Wireless Charging Technology and the Future of Electric Transportation, Beijing Institute of Technology Press, 2018, pp. 9-15 with English Translation.

(Continued)

*Primary Examiner* — Alexander G Kalinowski
*Assistant Examiner* — Sanjeev Malhotra
(74) *Attorney, Agent, or Firm* — Dilworth IP, LLC (57) ABSTRACT

The present application provides a self-driving vehicle positioning method, an apparatus and a storage medium, where the method includes: obtaining reference data, where the reference data includes: state information and running path information of at least one traffic participant within a preset distance from a self-driving vehicle, and updating positioning information of the self-driving vehicle according to the reference data. In the technical solutions, when a GPS signal is weak, the self-driving vehicle can also update the positioning information in time, thereby ensuring driving safety of the self-driving vehicle, and solving a driving safety problem existing in the self-driving vehicle of the prior art.

8 Claims, 5 Drawing Sheets

(51) Int. Cl.
*G06V 20/58* (2022.01)
*G06V 20/56* (2022.01)

(58) Field of Classification Search
CPC ...... G01C 21/32; G01C 21/34; G08G 1/0112;
G08G 1/096775; G08G 1/164; G08G
1/166; G08G 1/0145; G08G 1/096741;
G08G 1/167; G08G 1/0133; G08G
1/0141; G08G 1/07; G08G 1/096716;
G08G 1/096725; G08G 1/161; G08G
1/162; G08G 1/165; H04W 4/44; B60W
2050/143; B60W 2420/42; B60W
2520/105; B60W 2552/00; B60W
2554/00; B60W 2555/60; B60W 30/00;
B60W 30/0956; B60W 30/12; B60W
30/165; B60W 30/18163; B60W 40/09;
B60W 50/14; G06F 16/29; G06K
9/00791; G06K 9/00798; H04L 67/12
USPC ................. 701/25, 408, 96; 434/66
See application file for complete search history.

(56) References Cited

U.S. PATENT DOCUMENTS

| | | | |
|---|---|---|---|
| 2015/0012203 A1* | 1/2015 | Eriksson | B60W 30/16 701/96 |
| 2015/0177007 A1* | 6/2015 | Su | B60W 30/165 701/25 |
| 2017/0060129 A1* | 3/2017 | Ross | G08B 25/00 |
| 2017/0132521 A1* | 5/2017 | Xu | B60W 40/08 |
| 2018/0162396 A1* | 6/2018 | Ibuka | G05D 1/0088 |
| 2018/0218610 A1* | 8/2018 | Augst | G08G 1/166 |
| 2018/0245928 A1* | 8/2018 | Knorr | G06V 20/56 |
| 2019/0206254 A1* | 7/2019 | Tao | B60W 50/14 |
| 2019/0212153 A1* | 7/2019 | Adireddy | G08G 1/093 |
| 2019/0258251 A1* | 8/2019 | Ditty | G06F 15/7807 |
| 2020/0219388 A1* | 7/2020 | Liu | G08G 1/0141 |
| 2020/0250987 A1* | 8/2020 | Zhou | B60W 30/0956 |
| 2020/0406925 A1* | 12/2020 | Du | B60T 8/172 |
| 2021/0225162 A1* | 7/2021 | Tao | G05D 1/0088 |

FOREIGN PATENT DOCUMENTS

| | | |
|---|---|---|
| CN | 108413971 A | 8/2018 |
| CN | 108766004 A | 11/2018 |
| CN | 108896994 A | 11/2018 |

OTHER PUBLICATIONS

Rejection in CN Patent Application No. 201811505085.3 dated Mar. 9, 2021.

First Office Action issued in CN Patent Application No. 201811505085.3 dated May 7, 2020.

* cited by examiner

SELF-DRIVING VEHICLE POSITIONING METHOD, APPARATUS AND STORAGE MEDIUM

CROSS-REFERENCE TO RELATED APPLICATION

This application claims priority to Chinese Patent Application No. 201811505085.3, filed on Dec. 10, 2018, which is hereby incorporated by reference in its entirety.

TECHNICAL FIELD

The present application relates to the field of self-driving technology, and in particular, to a self-driving vehicle positioning method, an apparatus and a storage medium.

BACKGROUND

A self-driving vehicle, also known as an unmanned driving vehicles, is an intelligent vehicle that is unmanned driving and realized by a computer system, which relies on artificial intelligence, visual computing, radar, monitoring apparatus and global positioning system to collaborate to enable vehicle's computer system to operate the vehicle automatically and safely without human operations.

In the prior art, the self-driving vehicle relies on a global positioning system (GPS) to update positioning information to control driving of the self-driving vehicle.

However, when a GPS signal is weak, the self-driving vehicle cannot update the positioning information in time, resulting in a driving safety problem existing in the self-driving vehicle.

SUMMARY

The present application provides a self-driving vehicle positioning method, an apparatus and a storage medium to overcome the driving safety problem existing in the self-driving vehicle of the prior art.

A first aspect of the present application provides a self-driving vehicle positioning method, including:

obtaining reference data, where the reference data includes: state information and running path information of at least one traffic participant within a preset distance from a self-driving vehicle; and updating positioning information of the self-driving vehicle according to the reference data.

In a possible design of the first aspect, the updating positioning information of the self-driving vehicle according to the reference data includes:

determining a driving direction and a running lane of each traffic participant of the at least one traffic participant based on the state information and the running path information of at least one traffic participant; and updating the positioning information of the self-driving vehicle according to the driving direction and the running lane of the each traffic participant.

In another possible design of the first aspect, the obtaining reference data includes:

obtaining the reference data by visual perception or obstacle perception using a detection device disposed on the self-driving vehicle, where the detection device includes: a laser device, a camera device, a radar device, and an infrared device.

In yet another possible design of the first aspect, the method further includes:

controlling the self-driving vehicle to drive on a road corresponding to a preset driving path based on the updated positioning information.

In the above possible designs of the first aspect, the method further includes:

obtaining real-time road condition information of a driving path of the self-driving vehicle;

where the controlling the self-driving vehicle to drive on a road corresponding to a preset driving path based on the updated positioning information includes:

generating a control instruction based on the updated positioning information and the real-time road condition information; and controlling the self-driving vehicle to drive on the road corresponding to the preset driving path based on the control instruction.

In the above possible designs of the first aspect, the obtaining real-time road condition information of a driving path of the self-driving vehicle includes:

obtaining the real-time road condition information by a network device of a cell where the self-driving vehicle is currently located;

or obtaining the real-time road condition information by a road detection device disposed on the driving path of the self-driving vehicle.

A second aspect of the present application provides a self-driving vehicle positioning apparatus, including: an obtaining module and an updating module;

the obtaining module is configured to obtain reference data, where the reference data includes: state information and running path information of at least one traffic participant within a preset distance from a self-driving vehicle; and the updating module is configured to update positioning information of the self-driving vehicle according to the reference data.

In a possible design of the second aspect, the updating module includes: a determining unit and an updating unit;

the determining unit is configured to determine a driving direction and a running lane of each traffic participant of the at least one traffic participant based on the state information and the running path information of at least one traffic participant; and the updating unit is configured to update the positioning information of the self-driving vehicle according to the driving direction and the running lane of the each traffic participant.

In another possible design of the second aspect, the obtaining module is specifically configured to obtain the reference data by visual perception or obstacle perception using a detection device disposed on the self-driving vehicle.

In yet another possible design of the second aspect, the apparatus further includes: a control module;

the control module is configured to control the self-driving vehicle to drive on a road corresponding to a preset driving path based on the updated positioning information.

In the above possible designs of the second aspect, the obtaining module is further configured to obtain real-time road condition information of a driving path of the self-driving vehicle; and the control module includes: an instruction generating unit and a control unit;

the instruction generating unit is configured to generate a control instruction based on the updated positioning information and the real-time road condition information; and the control unit is configured to control the self-driving vehicle to drive on the road corresponding to the preset driving path based on the control instruction.

In the above possible designs of the second aspect, the obtaining module being further configured to obtain real-time road condition information of a driving path of the self-driving vehicle is specifically:

the obtaining module is further configured to obtain the real-time road condition information by a network device of a cell where the self-driving vehicle is currently located; or the obtaining module is further configured to obtain the real-time road condition information by a road detection device disposed on the driving path of the self-driving vehicle.

A third aspect of the present application provides a self-driving vehicle positioning apparatus, including: a processor, a memory and a computer program stored in the memory and executable on the processor, where the processor, when executing the computer program, implements the method of the first aspect and the various possible designs of the first aspect described above.

A fourth aspect of the present application provides a storage medium, where the storage medium has instructions stored therein, which, when run on a computer, cause the computer to execute the method of the first aspect and the various possible designs of the first aspect.

A fifth aspect of the present application provides a chip for running instructions, where the chip is configured to execute the method of the first aspect and the various possible designs of the first aspect described above.

Embodiments of the present application provide a self-driving vehicle positioning method, an apparatus and a storage medium, which obtain reference data, where the reference data includes: state information and running path information of at least one traffic participant within a preset distance from a self-driving vehicle, and update positioning information of the self-driving vehicle according to the reference data. In the technical solutions, when a GPS signal is weak, the self-driving vehicle can also update the positioning information in time, thereby ensuring driving safety of the self-driving vehicle, and solving a driving safety problem existing in the self-driving vehicle of the prior art.

DESCRIPTION OF EMBODIMENTS

In order to make the objectives, technical solutions, and advantages of the embodiments of the present application clearer, the technical solutions in the embodiments of the present application will be clearly and completely described in the following with reference to the accompanying drawings in the embodiments of the present application. It is obvious that the described embodiments are only a part of the embodiments, but not all embodiments, of the present application. All other embodiments obtained by those skilled in the art based on the embodiments of the present application without inventive labors are within the protection scope of the present application.

Figure 1:
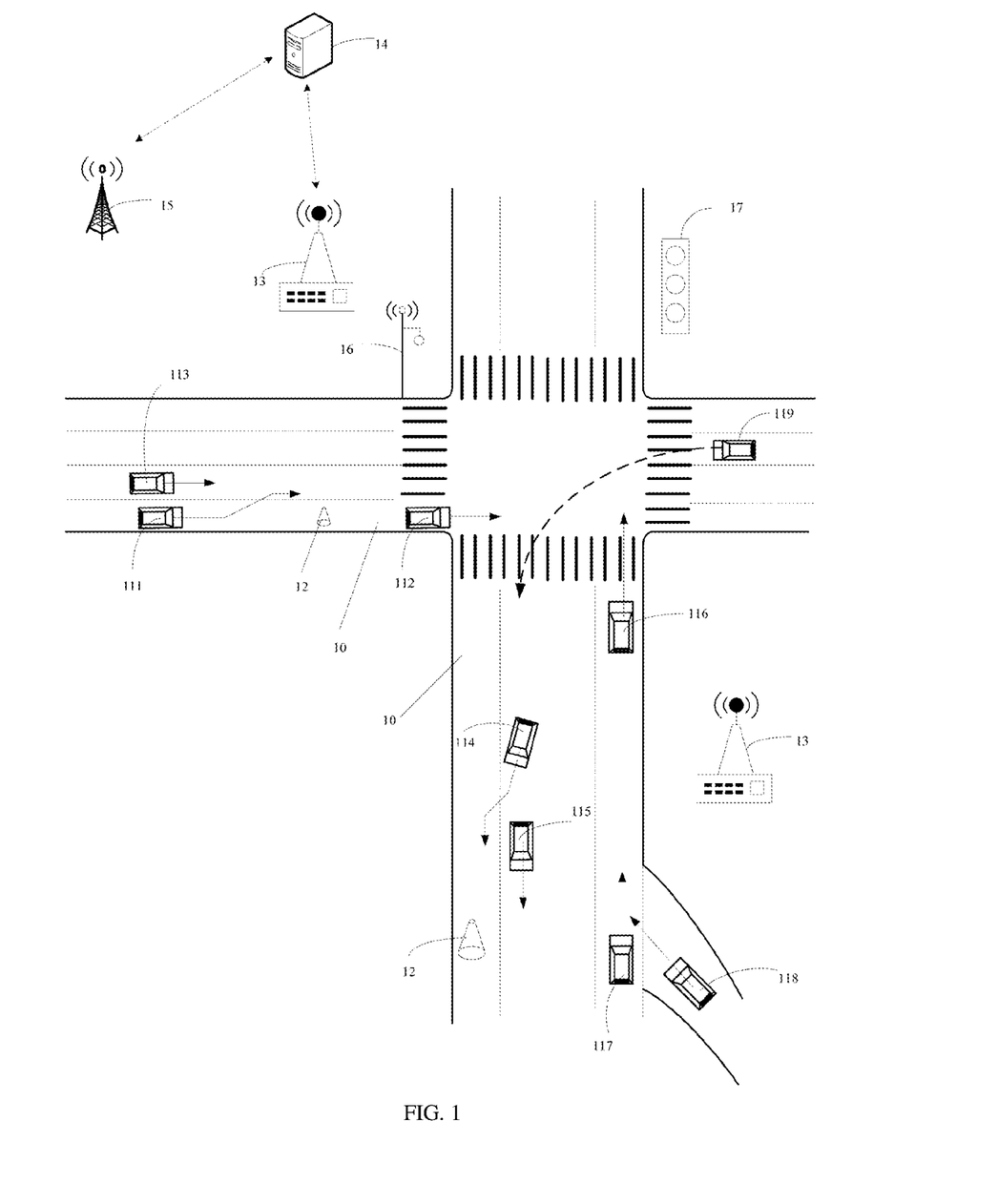
FIG. 1 is a schematic diagram of an application scenario of an intelligent traffic network according to an embodiment of the present application.

Self-driving vehicle positioning method provided by the following embodiment of the present application can be applied to an intelligent traffic network. FIG. 1 is a schematic diagram of an application scenario of an intelligent traffic network according to an embodiment of the present application. As shown in FIG. 1, the intelligent traffic network may include vehicles 111 to 119 driving on a lane 10, an obstacle 12 located on the lane 10, a traffic control device 13, a remote server 14, a base station 15, and a roadside device 16, a traffic facility 17 (such as traffic lights), and the like.

It is to be understood that the objects in the application scenario shown in FIG. 1 are only illustrative, and the embodiments of the present application do not specifically limit the objects included in the intelligent traffic network. In the intelligent traffic network, wireless communication can be performed between the vehicles, and wireless communication can also be performed between each vehicle (for example, the vehicles 111 to 119) and the traffic control device 13, and wireless communication can also be performed among the traffic control device 13, the remote server 14, the roadside device 16 and the base station 15, and the remote server 14 or the traffic control device 13 can further control the traffic facility, and the like.

Some vehicles are provided with a driving computer or an onboard unit (OBU), and some vehicles are equipped with a user terminal such as a mobile phone, and the like. The mobile phone, the driving computer or the OBU in the vehicle can communicate with a network side device, where the network side device here may specifically be the traffic control device, the base station, the roadside device, and the like.

A control apparatus may be disposed on the traffic signal lights disposed at an intersection, and the control apparatus can control signal lights of different colors on the traffic signal lights to turn on and off. The manner that the control apparatus controls the signal lights to turn on and off may be that: the control apparatus controls according to a preset control mechanism, or the control apparatus receives a control instruction sent by the remote server and controls the signal lights to turn on and off according to the control instruction.

In the embodiment, the control apparatus can also send color information of the signal light which is currently on of the traffic signal lights to the vehicles around the intersection to realize signal light prompt. Alternatively, the control apparatus can send the color information of the signal light which is currently on and a current time to the vehicles around the intersection. Alternatively, the control apparatus can also send the color information of the signal light which is currently on, position information of the traffic signal lights, and the current time to the vehicles around the intersection.

Illustratively, the vehicles in the embodiments of the present application may be self-driving vehicles or manned driving vehicles. Since the embodiment is to solve the driving safety problem existing in the self-driving vehicles, at least one of the above vehicles 111 to 119 is the self-driving vehicle, and the embodiments of the present application mainly describe the position positioning of the self-driving vehicle.

In the embodiment, the self-driving vehicle is a control object of the intelligent traffic network, and an onboard terminal is installed thereon, and the onboard terminal can be used for information interaction with other objects in the intelligent traffic network.

Illustratively, in the embodiment, a detection device may be installed on the self-driving vehicle, and the detection device can detect characteristics of surrounding objects during driving of the self-driving vehicle, for example, detecting characteristics such as a driving direction and a driving path of a traffic participant, and detecting information such as a distance change with a road obstacle or a roadside stationary object. The embodiment of the present application does not limit the specific function of the detection device.

The embodiments of the present application provide a self-driving vehicle positioning method, an apparatus and a storage medium, which obtain reference data, where the reference data includes at least one of the following information: state information and running path information of at least one traffic participant within a preset distance from a self-driving vehicle, and update positioning information of the self-driving vehicle according to the reference data. In the technical solutions, when a GPS signal is weak, the self-driving vehicle can also update the positioning information in time, which lays a foundation for realizing safe driving of the self-driving vehicle. The technical solutions of the present application are described in detail below through specific embodiments.

It should be noted that the following specific embodiments may be combined with each other, and the same or similar concepts or processes may not be described in some embodiments.

Figure 2:
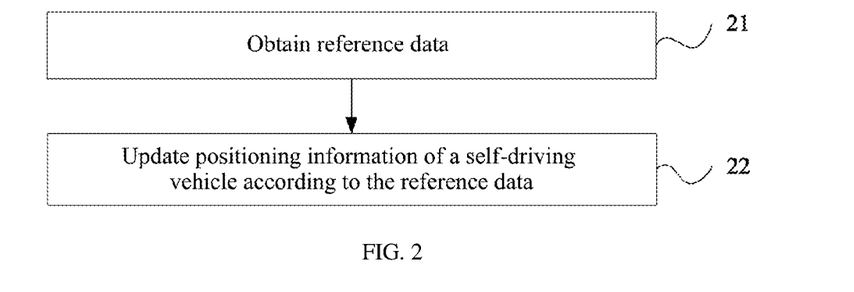
FIG. 2 is a schematic flowchart of Embodiment 1 of a self-driving vehicle positioning method according to an embodiment of the present application.

FIG. 2 is a schematic flowchart of Embodiment 1 of a self-driving vehicle positioning method according to an embodiment of the present application. The method can be applied to an onboard control system of a self-driving vehicle. As shown in FIG. 2, the method may include the following steps.

Step 21: obtaining reference data.

The reference data includes: state information and running path information of at least one traffic participant within a preset distance from a self-driving vehicle.

In the embodiment, the self-driving vehicle may detect surroundings of the self-driving vehicle in real time by using a sensor mounted on the vehicle during driving, for example, detecting state information and running path information of at least one traffic participant within a preset distance range from the self-driving vehicle. The self-driving vehicle can determine position information of the self-driving vehicle and a driving lane of the self-driving vehicle with reference to the state information and the running path information of the at least one traffic participant.

Therefore, in the embodiment, the obtained state information and running path information of the at least one traffic participant within the preset distance from the self-driving vehicle may be used as the reference data for determining the position information of the self-driving vehicle.

Illustratively, in the embodiment, the at least one traffic participant may include: various types of vehicles that are driving, cyclists, walkers, and the like. The embodiment does not limit the specific representation of the at least one traffic participant, which can be determined according to actual conditions.

Illustratively, in one possible design, the step 21 (obtaining reference data) can be implemented by the following step:

obtaining the reference data by visual perception or obstacle perception using a detection device disposed on the self-driving vehicle.

The detection device includes: a laser device, a camera device, a radar device, and an infrared device.

Illustratively, in the embodiment, the detection device may be disposed on the self-driving vehicle, and related information of objects within the preset distance range from the self-driving vehicle may be obtained through the detection device. During the driving of the self-driving vehicle, the onboard control system can send a detection signal to the surroundings through the detection device to obtain related information of various traffic participants.

For example, the detection device is configured to scan surrounding objects, and information about position, speed, acceleration of various traffic participants, conditions of traffic signal lights and road are obtained by visual perception or obstacle perception method, and the information is taken as the reference data of positioning information of the self-driving vehicle.

In an embodiment, the visual perception may be determining state information and running path information of a captured traffic participant by analyzing an image/video captured by an imaging device.

In an embodiment, the obstacle perception may be that a laser device or an infrared device detects whether a distance from an object or a target within a preset range changes and a change trend is to become larger or smaller by transmitting a signals, and thereby determining whether a driving mode needs to be changed, and the like.

In the embodiment, the reference data is obtained by the visual perception or the obstacle perception using the detection device disposed on the self-driving vehicle, which provides a guarantee for obtaining accurate positioning information, and lays a foundation for subsequent control of safe driving of the self-driving vehicle.

Illustratively, the detection device may include, but is not limited to, any one of the following devices: a radar device, a laser device, a camera device, and an infrared device. For example, the detection device may also be an ultrasonic detection device, a ranging detection device, a visual detection device, and the like, or combinations thereof.

Figure 3:
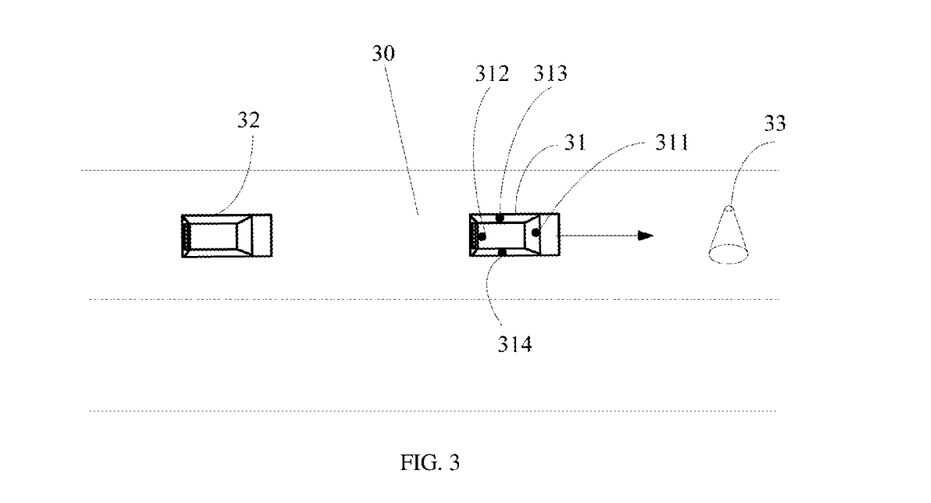
FIG. 3 is a schematic diagram of a scenario for obtaining reference data by a detection device in an embodiment of the present application.

Illustratively, FIG. 3 is a schematic diagram of a scenario for obtaining reference data by a detection device in an embodiment of the present application. As shown in FIG. 3, a self-driving vehicle 31 is normally driving on a lane 30, and a first detection device 311, a second detection device 312, a third detection device 313, and a fourth detection device 314, and the like, are disposed at four positions of front, rear, left, and right of the self-driving vehicle 31.

In an embodiment, the first detection device 311 disposed at the front end of the self-driving vehicle can detect whether there is an obstacle in front of the driving lane. If it is detected that there is an object in front, and a distance between the self-driving vehicle and the object gradually and uniformly becomes smaller, that is, when the self-driving vehicle is driving to a position where a distance to the object reaches a first preset safety distance, the front object does not change its position, then it can be considered that the object in a front lane of the self-driving vehicle is an obstacle (for example, an obstacle 33), and a lane change operation is required.

In an embodiment, the second detection device 312 disposed at the rear end of the self-driving vehicle can detect whether a distance between a rear vehicle in the driving lane (for example, a vehicle 32) and the vehicle is less than a second preset safety distance. If so, the onboard control system of the self-driving vehicle can transmit an alarm indication to the rear vehicle to instruct the rear vehicle to perform a deceleration or lane change driving.

Similarly, the third detection device 313 disposed at the left side of the self-driving vehicle and the fourth detection device 314 disposed at the right side of the self-driving vehicle can detect objects within a preset distance on both sides to ensure that the self-driving vehicle can safely drive.

It should be noted that each detection device can also perform a 360-degree detection or a 180-degree range detection. The embodiment does not limit the detection range and angle of each detection device, which can be determined according to actual conditions, and details are not described herein again.

Illustratively, in any one of the above embodiments of the present application, the reference data further includes: state information of the traffic signal lights, distance change information between the self-driving vehicle and an obstacle within a preset distance, running road information, moving state information, and running path information of the self-driving vehicle.

In the embodiment, the self-driving vehicle may further obtain the state information of the traffic signal lights by the detection device, and determine, according to the state information of the traffic signal lights, whether the vehicle can continue to drive at an intersection.

Illustratively, the self-driving vehicle may further obtain the distance change information between the self-driving vehicle and the obstacle within the preset distance by the detection device, and determine, according to the distance change information, whether the self-driving vehicle needs to perform operations such as deceleration, lane change, and the like.

Further, the self-driving vehicle may further obtain the running road information, the moving state information, and the running path information by the detection device, and thereby the self-driving vehicle can drive to a destination according to a preset driving path without departing from a driving path according to the running road information, the moving state information, and the running path information.

Step 22: updating positioning information of the self-driving vehicle according to the reference data.

Illustratively, the self-driving vehicle is an intelligent vehicle that can realize unmanned driving by control of a computer system, the computer system may be a control system of an external device or a control system of the self-driving vehicle. However, regardless of whether the computer system is of an external device or of the self-driving vehicle itself, it need to wirelessly communicate with an external device, especially receive a regulation of control center server.

Usually, an operating environment of the self-driving vehicle is an area with good network signal or good GPS signal strength, but in some cases, the self-driving vehicle is in an area where the network signal is not good, for example, in a tunnel, a mountain area, and the like. The onboard control system of the self-driving vehicle may be unable to communicate with the external device. At this time, the positioning information of the self-driving vehicle may be updated in real time based on the obtained reference data above, so that the self-driving vehicle can accurately determine position information or lane information of its running section.

Therefore, in the embodiment, if the GPS signal is not detected within a preset time period or the detected GPS signal strength is less than a preset strength, the positioning information of the self-driving vehicle can be updated according to the obtained reference data above.

In the embodiment of the present application, the onboard control system detects the GPS signal in real time during the driving of the self-driving vehicle. Generally, the onboard control system can always detect the GPS signal and the GPS signal strength is greater than the preset strength. But when the above self-driving vehicle is driving in the area where the network signal is not good, there may be a case where the GPS signal is not detected within the preset time period or the detected GPS signal strength is less than the preset strength, then the onboard control system of the self-driving needs to update the positioning information of the self-driving vehicle based on the obtained reference data above.

The self-driving vehicle positioning method provided by the embodiment of the present application obtains reference data, where the reference data includes: state information and running path information of at least one traffic participant within a preset distance from the self-driving vehicle, and updates positioning information of the self-driving vehicle according to the reference data. In the technical solution, when the GPS signal is weak, THE self-driving vehicle can also update the positioning information in time, which provides a guarantee for safe driving of the self-driving vehicle.

Figure 4:
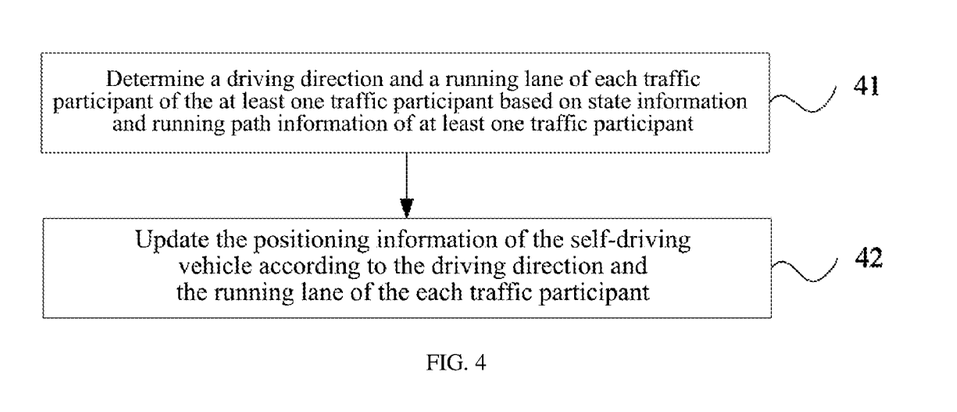
FIG. 4 is a schematic flowchart of Embodiment 2 of a self-driving vehicle positioning method according to an embodiment of the present application.

Illustratively, based on the foregoing embodiment, FIG. 4 is a schematic flowchart of Embodiment 2 of a self-driving vehicle positioning method according to an embodiment of the present application. As shown in FIG. 4, in the embodiment, the above step 22 (updating positioning information of the self-driving vehicle according to the reference data) can be implemented by the following steps.

Step 41: determining a driving direction and a running lane of each traffic participant of the at least one traffic participant based on the state information and the running path information of at least one traffic participant.

In the embodiment, the self-driving vehicle can know the state information and the running path information of the at least one traffic participant by communicating with the at least one participant within the preset distance, or can detect and obtain the state information and the running path information of the at least one traffic participant within the preset range of the self-driving vehicle in real time by using the sensor disposed on the vehicle.

Illustratively, for example, the state information may include: a running state of a traffic participant, and the running state may include: a driving state, a stationary state, and a driving direction, a driving speed, and the like corresponding to the driving state; and the running path information includes: driving continuously in a same lane, or changing lanes, and the like.

Therefore, in the embodiment, the self-driving vehicle can determine the driving direction and the running lane of the each traffic participant by analyzing the obtained state information and running path information of the at least one traffic participant.

Step 42: updating the positioning information of the self-driving vehicle according to the driving direction and the running lane of the each traffic participant.

Illustratively, in the embodiment, the self-driving vehicle will not be in a state in which the GPS signal is very weak or the GPS signal is not detected for a long time during driving. Therefore, generally, the driving direction and the running lane of the self-driving vehicle can remain unchanged in a preset time period, and are consistent with a driving direction and a running lane of most traffic participants, so that the self-driving vehicle can update its positioning information according to the driving direction and the running lane of each traffic participant during driving.

The self-driving vehicle positioning method provided by the embodiment of the present application determines a driving direction and a running lane of each traffic participant of the at least one traffic participant based on the state information and the running path information of at least one traffic participant, and updates the positioning information of the self-driving vehicle according to the driving direction and the running lane of the each traffic participant. In the technical solution, the self-driving vehicle can automatically update positioning information when the GPS signal is weak, thereby ensuring accuracy of the positioning information.

Figure 5:
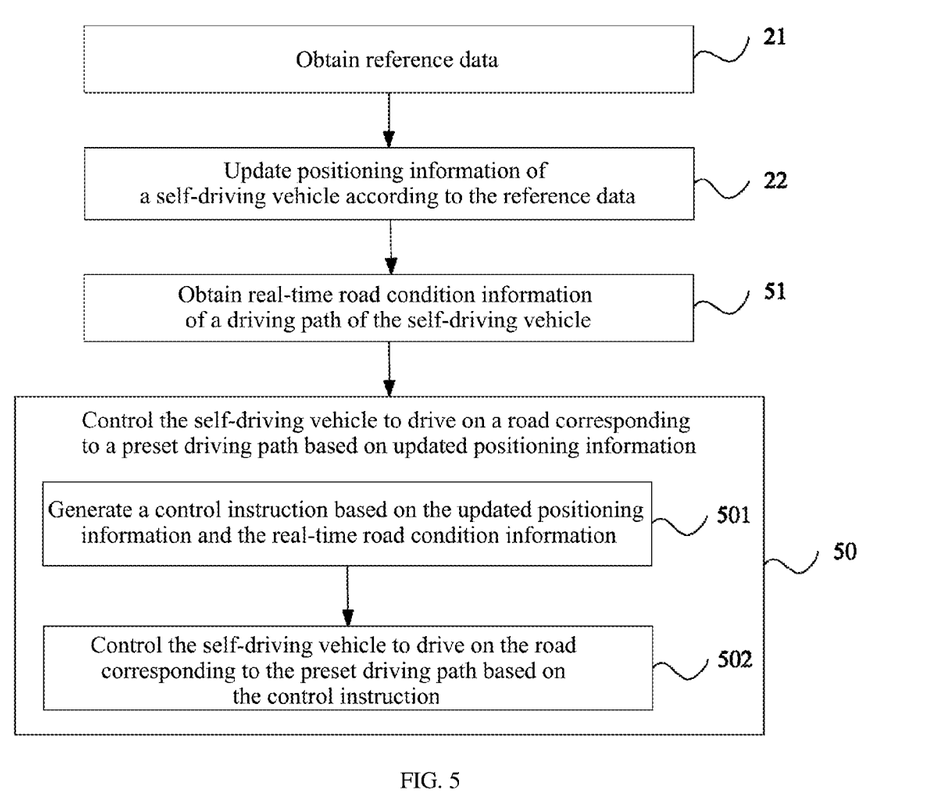
FIG. 5 is a schematic flowchart of Embodiment 3 of a self-driving vehicle positioning method according to an embodiment of the present application.

In an embodiment, on the basis of any one of the foregoing embodiments, FIG. 5 is a schematic flowchart of Embodiment 3 of a self-driving vehicle positioning method according to an embodiment of the present application. As shown in FIG. 5, the self-driving vehicle positioning method provided by the embodiment of the present application may further include the following steps.

Step 50: controlling the self-driving vehicle to drive on a road corresponding to a preset driving path based on the updated positioning information.

Illustratively, in the embodiment, after the onboard control system of the self-driving vehicle updates the positioning information based on the reference data, it can be obtained the updated positioning information, and control, based on the updated positioning information and the preset driving path preset in the onboard control system, the self-driving vehicle to drive on the road corresponding to the preset driving path in real time until reaching the destination.

In the embodiment, the self-driving vehicle positioning method may further include the following steps.

Step 51: obtaining real-time road condition information of a driving path of the self-driving vehicle.

Illustratively, the step may be located before step 50, before the controlling the self-driving vehicle to drive on a road corresponding to a preset driving path based on the updated positioning information, the real-time road condition information of the driving path of the self-driving vehicle may be first obtained, which thus assists the self-driving vehicle to control the driving state of the self-driving vehicle.

It can be understood that the road condition information of the driving path of the self-driving vehicle may be different at different times, for example, traffic congestion information, and path restriction information of the driving path, and the like. The onboard control system can obtain the real-time road condition information of the driving path of the self-driving vehicle by itself, and assist generation of a control instruction based on the updated positioning information of the self-driving vehicle.

In the embodiment of the present application, the manner in which the onboard control system obtains the real-time road condition information of the driving path of the self-driving vehicle may be various, for example, using a network device to which a current cell where the self-driving vehicle is located belongs or a road detection device disposed on the driving path of the self-driving vehicle, and the like.

Illustratively, in a possible implementation, the network device to which the current cell where the self-driving vehicle is located belongs can monitor the driving path of the self-driving vehicle, and thus the onboard control system of the self-driving vehicle can obtain the real-time road condition information by performing real time information interaction with the network device.

Specifically, when the current cell in which the self-driving vehicle is driving is located within a coverage of the network device to which the current cell belongs, the network device can be used to monitor the driving path of the self-driving vehicle, thereby obtaining the real-time road condition information of the driving path.

Illustratively, in another possible implementation, the onboard control system obtains the real-time road condition information by the road detection device disposed on the driving path of the self-driving vehicle. In an embodiment, the road detection device may be disposed on a plurality of roads, so that when the self-driving vehicle is driving on a road, the road detection device on the driving road of the self-driving vehicle may send the obtained real-time road condition information of the driving path to the onboard control system in real time.

It should be noted that the present application does not limit the manner in which the real-time road condition information is obtained, and it can be obtained only through the network device or the road detection device, or can be obtained through a combination of the two, and can also be obtained through other manners. In practical applications, the obtaining manner can be determined based on actual conditions, and detains are not described herein again.

In an embodiment, when the updated positioning information is obtained and the real-time road condition information is obtained, the above step 50 (controlling the self-driving vehicle to drive on a road corresponding to a preset driving path based on the updated positioning information) may be implemented by the following step 501 and step 502.

Step 501: generating a control instruction based on the updated positioning information and the real-time road condition information.

In the embodiment of the present application, after the onboard control system updates the positioning information based on the obtained reference data, and obtains the real-time road condition information monitored by the network device and/or the road detection device, the onboard control system may jointly generate the control instruction based on the updated positioning information and the real-time road condition information.

Illustratively, in the embodiment, the generation of the control instruction may also refer to other factors, such as vehicle state information, running time information of the self-driving vehicle, and the like. The embodiment does not limit all the reference information for generating the control instruction, which can be determined according to actual conditions in practical applications.

It should be noted that the control instruction in the embodiment is generated by the onboard control system of the self-driving vehicle, and is mainly applied in the scenario where the GPS signal is poor or a network signal of a network where the self-driving vehicle is located is poor. In practical applications, the self-driving vehicle may update information of the position where it is located when the GPS signal strength is greater than the preset strength, or may receive a control instruction generated and sent by a server when the network signal of the network where it is located is good.

Step 502: controlling the self-driving vehicle to drive on the road corresponding to the preset driving path based on the control instruction.

In the embodiment, after the vehicle control system generates the control instruction, it may combine the preset driving path preset in the system to control the self-driving vehicle to drive on the road corresponding to the preset driving path based on the control instruction, and safely reach the destination. The self-driving vehicle can be more accurately controlled using the control instruction, which ensures the driving safety of the self-driving vehicle.

The self-driving vehicle positioning method provided by the embodiment of the present application may further obtain real-time road condition information of a driving path of the self-driving vehicle after updating the positioning information of the self-driving vehicle based on the obtained reference data, and thus may generate a control instruction based on the updated positioning information and the real-time road condition information, which can ensure that the self-driving vehicle is accurately scheduled, thereby ensuring safe driving of the self-driving vehicle on the road.

The following are apparatus embodiments of the present application, which may be configured to implement the method embodiments of the present application. For details not disclosed in the apparatus embodiments of the present application, please refer to the method embodiments of the present application.

Figure 6:
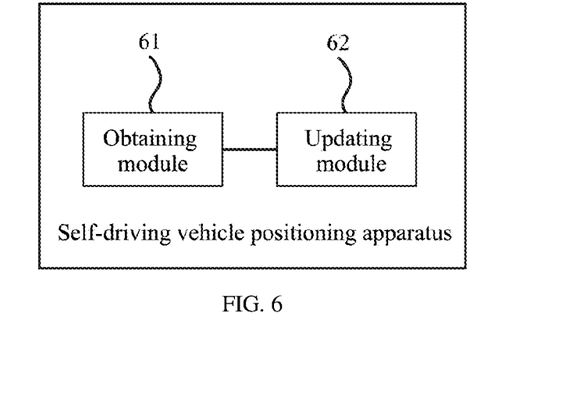
FIG. 6 is a schematic structural diagram of Embodiment 1 of a self-driving vehicle positioning apparatus according to an embodiment of the present application.

FIG. 6 is a schematic structural diagram of Embodiment 1 of a self-driving vehicle positioning apparatus according to an embodiment of the present application. The apparatus can be applied to an onboard control system of a self-driving vehicle. As shown in FIG. 6, the apparatus may include: an obtaining module 61 and an updating module.

The obtaining module is configured to obtain reference data.

The reference data includes: state information and running path information of at least one traffic participant within a preset distance from the self-driving vehicle.

The updating module 62 is configured to update positioning information of the self-driving vehicle according to the reference data.

Figure 7:
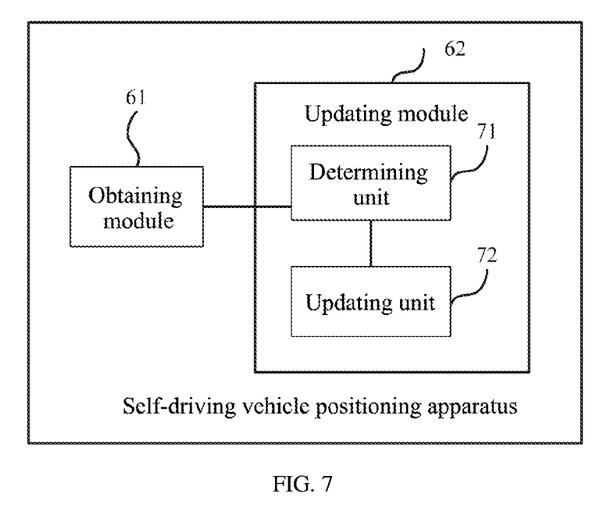
FIG. 7 is a schematic structural diagram of Embodiment 2 of a self-driving vehicle positioning apparatus according to an embodiment of the present application.

Illustratively, on the basis of the embodiment, FIG. 7 is a schematic structural diagram of Embodiment 2 of a self-driving vehicle positioning apparatus according to an embodiment of the present application. As shown in FIG. 7, the updating module 62 may include: a determining unit 71 and an updating unit 72.

The determining unit 71 is configured to determine a driving direction and a running lane of each traffic participant of the at least one traffic participant based on the state information and the running path information of at least one traffic participant; and the updating unit 72 is configured to update the positioning information of the self-driving vehicle according to the driving direction and the running lane of the each traffic participant.

Illustratively, in a possible design of the embodiment, the obtaining module 61 is specifically configured to obtain the reference data by visual perception or obstacle perception using a detection device disposed on the self-driving vehicle.

The detection device includes: a laser device, a camera device, a radar device, and an infrared device.

In an embodiment, the reference data further includes: state information of traffic signal lights, distance change information between the self-driving vehicle and an obstacle within a preset distance, running road information, moving state information, and running path information of the self-driving vehicle.

Figure 8:
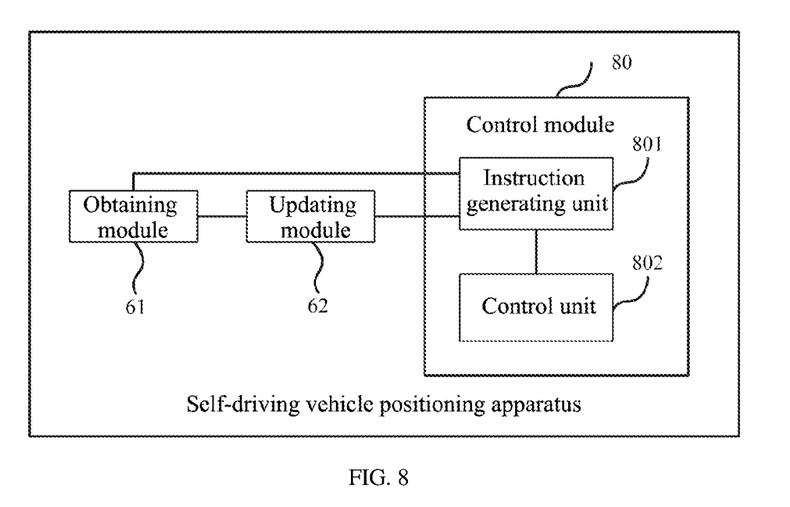
FIG. 8 is a schematic structural diagram of Embodiment 3 of a self-driving vehicle positioning apparatus according to an embodiment of the present application.

Illustratively, on the basis of the above embodiment, FIG. 8 is a schematic structural diagram of Embodiment 3 of a self-driving vehicle positioning apparatus according to an embodiment of the present application. As shown in FIG. 8, in the embodiment, the apparatus may further include: a control module 80.

The control module 80 is configured to control the self-driving vehicle to drive on a road corresponding to a preset driving path based on the updated positioning information.

Illustratively, in the embodiment, the obtaining module 61 is further configured to obtain real-time road condition information of the driving path of the self-driving vehicle.

The real-time road condition information includes: traffic congestion condition, path restriction information.

As an example, the obtaining module 61 is specifically configured to obtain the real-time road condition information by a network device of a cell where the self-driving vehicle is currently located.

As another example, the obtaining module 61 is specifically configured to obtain the real-time road condition information by a road detection device disposed on the driving path of the self-driving vehicle.

Correspondingly, in the embodiment, the control module 80 may include: an instruction generating unit 801 and a control unit 802.

The instruction generating unit 801 is configured to generate a control instruction based on the updated positioning information and the real-time road condition information; and the control unit 802 is configured to control the self-driving vehicle to drive on a road corresponding to a preset driving path based on the control instruction.

The apparatuses provided in the embodiments shown in FIG. 6 to FIG. 8 can be configured to perform the methods in the embodiments shown in FIG. 2 to FIG. 5, and the implementation principles and technical effects are similar, and details are not described herein again.

It should be noted that the division of each module of the above apparatus is only a division of a logical function, and may be integrated into one physical entity in whole or in part in actual implementation, or may be physically separated. These modules can all be implemented by software in the form of processing component calls; or all of them can be implemented in hardware form; or some modules can be realized by processing component calling software, and some modules are realized in hardware form. For example, the determining module may be a separately set processing component, or may be integrated in a chip of the above-mentioned apparatus, or may be stored in the memory of the above apparatus in the form of program code and called by a processing component of the above apparatus to execute the functions of the above determining module. The implementation of other modules is similar. In addition, all or part of these modules can be integrated or implemented independently. The processing component described herein may be an integrated circuit with signal processing capabilities. In implementation process, each step of the above method or each of the above modules may be completed by an integrated logic circuit of hardware in the processor component or instructions in a form of software.

For example, the above modules may be one or more integrated circuits configured to implement the above methods, such as one or more application specific integrated circuits (ASICs), or one or more digital signal processors (DSPs), or one or more field programmable gate arrays (FPGAs). As another example, when one of the above modules is implemented in the form of calling program codes by a processing component, the processing component may be a general purpose processor, such as a central processing unit (CPU) or other processors that can call program codes. As another example, these modules can be integrated and implemented in the form of a system-on-a-chip (SOC).

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present application are generated in whole or in part. The computer may be a general purpose computer, a special purpose computer, a computer network, or other programmable devices. The computer instructions can be stored in a computer readable storage medium or transmitted from one computer readable storage medium to another computer readable storage medium, for example, the computer instructions can be transmitted from a website site, computer, server or data center to another website site, computer, server, or data center by wire (for example, a coaxial cable, a fiber optic, a digital subscriber line (DSL), or wireless (for example, infrared, wireless, microwave, and the like). The computer readable storage medium can be any available medium accessible by a computer or a data storage device such as a server, data center, and the like that includes one or more available media. The available medium may be a magnetic medium (for example, a floppy disk, a hard disk, a magnetic tape), an optical medium (for example, a Digital Video Disc (DVD)), or a semiconductor medium (for example, a solid state disk (SSD)), and the like.

Figure 9:
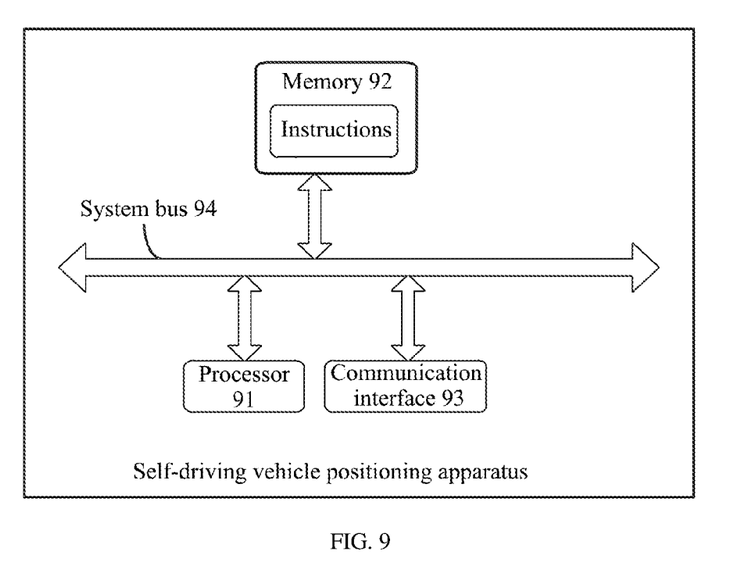
FIG. 9 is a schematic structural diagram of Embodiment 4 of a self-driving vehicle positioning apparatus according to an embodiment of the present application.

FIG. 9 is a schematic structural diagram of Embodiment 4 of a self-driving vehicle positioning apparatus according to an embodiment of the present application. As shown in FIG. 9, the apparatus may include: a processor 91, a memory 92, a communication interface 93, and a system bus 94, the memory 92 and the communication interface 93 is coupled to the processor 91 via the system bus 94 and complete communication with the same, and the memory 92 is configured to store computer program, the communication interface 93 is configured to communicate with other devices, and the processor 91 implements the solutions of the onboard control system in the embodiments shown in FIG. 2 to FIG. 5 when executing the computer program.

The system bus mentioned in FIG. 9 may be a peripheral components interconnect (PCI) bus or an extended industry standard architecture (EISA) bus, and the like. The system bus can be divided into an address bus, a data bus, a control bus, and the like. For ease of representation, only one thick line is shown in the figure for representation, but it does not mean that there is only one bus or one type of bus. The communication interface is configured to implement communication between a database access apparatus and other devices such as clients, read-write libraries, and read-only libraries. The memory may include a random access memory (RAM), and may also include a non-volatile memory, such as at least one disk storage.

The above processor may be a general purpose processor, including a central processing unit CPU, a network processor (NP), and the like; or may be a digital signal processor DSP, an application specific integrated circuit ASIC, a field programmable gate array FPGA, or other programmable logic devices, discrete gates or transistor logic devices, discrete hardware components.

An embodiment of the present application further provides a storage medium, where the storage medium has instructions stored therein, which, when run on a computer, cause the computer to execute the methods of the embodiments shown FIG. 2 to FIG. 5.

An embodiment of the present application further provides a chip for running instructions, where the chip is configured to perform the methods of the embodiments shown FIG. 2 to FIG. 5.

An embodiment of the present application further provides a program product, where the program product includes a computer program, where the computer program is stored in a storage medium, and at least one processor can read the computer program from the storage medium, and the at least one processor implements the methods of the embodiments shown in FIG. 2 to FIG. 5 when executing the computer program.

In the present application, the "at least one" means one or more, and the "multiple" means two or more. The "and/or" describes association relationship of associated objects, indicating that there may be three relationships, for example, A and/or B may indicate that A exists separately, A and B exist at the same time, or B exists separately, where A, B may be singular or plural. The character "/" generally indicates that the contextual associated objects are an "or" relationship; in the formula, the character "/" indicates that the contextual associated objects are a "divide" relationship. The "at least one of the following" or a similar expression thereof refers to any combination of these items, including any combination of a single item or a plural items. For example, at least one of a, b, or c may represent: a, b, c, a-b, a-c, b-c, or a-b-c, where a, b, c may be one or more.

It is to be understood that the various numbers referred to in the embodiments of the present application are distinguished merely for convenience of description and are not intended to limit the scope of the embodiments of the present application.

It is to be understood that, in the embodiments of the present application, the sequence numbers of the foregoing processes do not mean the order of execution sequence, and the execution order of each process should be determined by its function and internal logic, and should not constitute any limitation on the implementation process of the embodiments of the present application.

Finally, it should be noted that the above embodiments are merely used to illustrate the technical solutions of the present application, rather than limiting them. Although the present application has been described in detail with reference to the foregoing embodiments, those skilled in the art should understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present application.

What is claimed is:

1. A self-driving vehicle positioning method, comprising:
obtaining reference data, wherein the reference data comprises: state information and running path information of at least one traffic participant within a preset distance from a self-driving vehicle;
determining a driving direction and a running lane of each traffic participant of the at least one traffic participant based on the state information and the running path information of at least one traffic participant; and
updating the positioning information of the self-driving vehicle according to the driving direction and the running lane of the each traffic participant;
wherein the method further comprises:
receiving real-time road condition information from a network device of a current cell where the self-driving vehicle is located, wherein the real-time road condition information is obtained by the network device by monitoring a driving path of the self-driving vehicle;
wherein the method further comprises:
detecting whether a distance between a rear vehicle in the driving lane and the self-driving vehicle is less than a second preset safety distance, and when the distance between the rear vehicle in the driving lane and the self-driving vehicle is less than the second preset safety distance, transmitting an alarm indication to the rear vehicle to instruct the rear vehicle to perform a deceleration or lane change driving;
wherein the method further comprises:
controlling the self-driving vehicle to drive on a road corresponding to a preset driving path based on the updated positioning information;
wherein the controlling the self-driving vehicle to drive on a road corresponding to a preset driving path based on the updated positioning information comprises:
generating a control instruction based on the updated positioning information and the real-time road condition information; and
controlling the self-driving vehicle to drive on the road corresponding to the preset driving path based on the control instruction.

2. The method according to claim 1, wherein the obtaining reference data comprises:
obtaining the reference data by visual perception or obstacle perception using a detection device disposed on the self-driving vehicle.

3. The method according to claim 2, wherein the detection device comprises at least one of a laser device, a camera device, a radar device, and an infrared device.

4. The method according to claim 1, wherein the reference data further comprises: state information of traffic signal lights, distance change information between the self-driving vehicle and an obstacle within a preset distance, running road information, moving state information, and running path information of the self-driving vehicle.

5. A self-driving vehicle positioning apparatus, comprising: a memory, a processor, and a computer program stored on the memory and operable on the processor,
wherein the processor, when running the computer program, is configured to:
obtain reference data, wherein the reference data comprises: state information and running path information of at least one traffic participant within a preset distance from a self-driving vehicle;
determine a driving direction and a running lane of each traffic participant of the at least one traffic participant based on the state information and the running path information of at least one traffic participant; and
update the positioning information of the self-driving vehicle according to the driving direction and the running lane of the each traffic participant;
wherein the processor is further configured to:
receive real-time road condition information from a network device of a current cell where the self-driving vehicle is located, wherein the real-time road condition information is obtained by the network device by monitoring a driving path of the self-driving vehicle;
wherein the processor is further configured to:
detect whether a distance between a rear vehicle in the driving lane and the self-driving vehicle is less than a second preset safety distance, and when the distance between the rear vehicle in the driving lane and the self-driving vehicle is less than the second preset safety distance, transmit an alarm indication to the rear vehicle to instruct the rear vehicle to perform a deceleration or lane change driving;
wherein the processor is further configured to:
control the self-driving vehicle to drive on a road corresponding to a preset driving path based on the updated positioning information;
wherein the processor is further configured to:
generate a control instruction based on the updated positioning information and the real-time road condition information; and
control the self-driving vehicle to drive on the road corresponding to the preset driving path based on the control instruction.

6. The apparatus according to claim 5, wherein the processor is further configured to:
obtain the reference data by visual perception or obstacle perception using a detection device disposed on the self-driving vehicle.

7. The apparatus according to claim 6, wherein the detection device comprises at least one of a laser device, a camera device, a radar device, and an infrared device.

8. The apparatus according to claim 5, wherein the at least one traffic participant comprises at least one of a driving vehicle, a cyclist, and a walker.

* * * * *